US011860903B1

(12) United States Patent
Geng

(10) Patent No.: US 11,860,903 B1
(45) Date of Patent: Jan. 2, 2024

(54) CLUSTERING DATA BASE ON VISUAL MODEL

(71) Applicant: Ciitizen, LLC, San Francisco, CA (US)

(72) Inventor: Kunling Geng, Milpitas, CA (US)

(73) Assignee: Ciitizen, LLC, San Francisco, CA (US)

( * ) Notice: Subject to any disclaimer, the term of this patent is extended or adjusted under 35 U.S.C. 154(b) by 813 days.

(21) Appl. No.: 16/702,405

(22) Filed: Dec. 3, 2019

(51) Int. Cl.
  *G06F 16/00* (2019.01)
  *G06F 16/28* (2019.01)
  *G06F 16/55* (2019.01)

(52) U.S. Cl.
  CPC ............ *G06F 16/285* (2019.01); *G06F 16/55* (2019.01)

(58) Field of Classification Search
  CPC .............................. G06F 16/285; G06F 16/55
  See application file for complete search history.

(56) References Cited

U.S. PATENT DOCUMENTS

| | | | | |
|---|---|---|---|---|
| 2007/0168382 A1* | 7/2007 | Tillberg | ................ | G06F 16/313 707/E17.084 |
| 2008/0046441 A1* | 2/2008 | Wen | ...................... | G06F 40/137 |
| 2010/0223214 A1* | 9/2010 | Kirpal | ..................... | G06F 16/86 706/12 |
| 2013/0294690 A1* | 11/2013 | Urbach | .................. | G06V 10/40 382/176 |
| 2015/0199351 A1* | 7/2015 | Borenstein | .............. | G06F 16/43 707/740 |
| 2016/0162514 A1* | 6/2016 | Cheung | ................. | G06F 16/958 707/741 |
| 2018/0068019 A1* | 3/2018 | Novikoff | ............. | G06F 16/4393 |
| 2018/0107933 A1* | 4/2018 | Wang | ................... | G06F 16/9535 |
| 2018/0143980 A1* | 5/2018 | Tanikella | .............. | G06F 16/285 |
| 2020/0193552 A1* | 6/2020 | Turkelson | ............ | G06K 9/6232 |
| 2020/0279171 A1* | 9/2020 | Mazzoleni | .......... | G06F 16/9035 |
| 2020/0311077 A1* | 10/2020 | Zhang | ..................... | G06F 3/068 |
| 2021/0110527 A1* | 4/2021 | Wheaton | ............... | G06F 40/284 |

OTHER PUBLICATIONS

Triwijoyo et al., Analysis of Document Clustering based on Cosine Similarity and K-Main Algorithms. (Year: 2019).*
Altuncu et al., From free text to clusters of content in health records: an unsupervised graph partitioning approach. (Year: 2019).*
Zhu et a., Measuring Patient Similarities via a Deep Architecture with Medical Concept Embedding. (Year: 2019).*
Elin Lütz, Unsupervised learning to detect patient subgroups in electronic health records. (Year: 2019).*
Gøeg et al., Clustering clinical models from local electronic health records based on semantic similarity. (Year: 2015).*
Wang et al., Unsupervised machine learning for the discovery of latent disease clusters and patient subgroups using electronic health records. (Year: 2019).*

* cited by examiner

*Primary Examiner* — Syed H Hasan
(74) *Attorney, Agent, or Firm* — Sterne, Kessler, Goldstein & Fox P.L.L.C.

(57) ABSTRACT

Some embodiments provide a non-transitory machine-readable medium that stores a program. The program receives a plurality of documents. The program further uses a visual model to generate a vector representation for each document in the plurality of documents. The program also clusters the plurality of documents into a set of clusters based on the vector representations of the plurality of documents. The program further determines a sample set of documents from the plurality of documents based on the set of clusters.

20 Claims, 7 Drawing Sheets

CLUSTERING DATA BASE ON VISUAL MODEL

BACKGROUND

For machine learning algorithms, a mathematical model is typically used to make predictions or decisions for a given input. In order to produce sufficiently accurate predictions, a mathematical model needs to be trained using training data. A number of different techniques can be used to train a mathematical model. For example, an unsupervised learning technique involves building a mathematical model based a set of input data. The input data may be analyzed to identify commonalities in the input data. This way, the mathematical model can then react based on the presence or absence of these commonalities for a given piece of new data. Another technique is supervised learning. With supervised learning, a mathematical model is trained using input data and corresponding desired output data. Supervised learning often employs a user that reviews all the training data and labels them accordingly in order to augment the data with additional information. Mathematical models can need a lot of training data to produce sufficiently accurate predictions. Therefore, the review and labeling of training data can require a lot of human resources and be very time-consuming.

SUMMARY

In some embodiments, a non-transitory machine-readable medium stores a program executable by at least one processing unit of a device. The program receives a plurality of documents. The program further uses a visual model to generate a vector representation for each document in the plurality of documents. The program also clusters the plurality of documents into a set of clusters based on the vector representations of the plurality of documents. The program further determines a sample set of documents from the plurality of documents based on the set of clusters.

In some embodiments, the program may further convert each document in the plurality of documents into a set of images. Using the visual model to generate the vector representation of the document may include generating, by the visual model, a vector for each image in the set of images. Clustering the documents into the set of clusters may include clustering the sets of images into the set of clusters based on the sets of vectors. Clustering the plurality of documents into the set of clusters may include grouping documents in the plurality of documents having similar vector representations into a same cluster. A first document in the plurality of documents and a second document in the plurality of documents may have similar vector representations if a cosine similarity between the vector representation of the first document and the vector representation of the second document is greater than a defined threshold value.

In some embodiments, determining the sample set of documents from the plurality of documents may include randomly selecting a set of documents from each cluster in the set of clusters and including the set of documents in the sample set of documents. The visual model may be implemented using a convolutional neural network comprising an input layer and a set of hidden layers.

In some embodiments, a method receives a plurality of documents. The method further uses a visual model to generate a vector representation for each document in the plurality of documents. The method also clusters the plurality of documents into a set of clusters based on the vector representations of the plurality of documents. The method further determines a sample set of documents from the plurality of documents based on the set of clusters.

In some embodiments, the method may further convert each document in the plurality of documents into a set of images. Using the visual model to generate the vector representation of the document may include generating, by the visual model, a vector for each image in the set of images. Clustering the documents into the set of clusters may include clustering the sets of images into the set of clusters based on the sets of vectors. Clustering the plurality of documents into the set of clusters may include grouping documents in the plurality of documents having similar vector representations into a same cluster. A first document in the plurality of documents and a second document in the plurality of documents may have similar vector representations if a cosine similarity between the vector representation of the first document and the vector representation of the second document is greater than a defined threshold value.

In some embodiments, determining the sample set of documents from the plurality of documents may include randomly selecting a set of documents from each cluster in the set of clusters and including the set of documents in the sample set of documents. The visual model may be implemented using a convolutional neural network comprising an input layer and a set of hidden layers.

In some embodiments, a system include a set of processing units and a non-transitory machine-readable medium that stores instructions. The instructions cause at least one processing unit to receive a plurality of documents. The instructions further cause the at least one processing unit to use a visual model to generate a vector representation for each document in the plurality of documents. The instructions also cause the at least one processing unit to cluster the plurality of documents into a set of clusters based on the vector representations of the plurality of documents. The instructions further cause the at least one processing unit to determine a sample set of documents from the plurality of documents based on the set of clusters.

In some embodiments, the instructions may further cause the at least one processing unit to convert each document in the plurality of documents into a set of images. Using the visual model to generate the vector representation of the document may include generating, by the visual model, a vector for each image in the set of images. Clustering the documents into the set of clusters may include clustering the sets of images into the set of clusters based on the sets of vectors. Clustering the plurality of documents into the set of clusters may include grouping documents in the plurality of documents having similar vector representations into a same cluster. A first document in the plurality of documents and a second document in the plurality of documents may have similar vector representations if a cosine similarity between the vector representation of the first document and the vector representation of the second document is greater than a defined threshold value. Determining the sample set of documents from the plurality of documents may include randomly selecting a set of documents from each cluster in the set of clusters and including the set of documents in the sample set of documents.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

1. Overview

Described herein are techniques for clustering data based on a visual model. In some embodiments, these techniques involve processing multiple text documents using a visual model. The visual model may be configured to detect and classify objects in documents. To process a text document, the document is converted into an image. The visual model is used to determine a vector representation of the document based on the image. Next, the documents are grouped into different groups based on the vector representations of the documents. In some embodiments, a random sample of documents can be selected from the different groups of documents in order to train a machine learning model that is used for automatedly annotating training data.

2. Clustering and Sampling Manager

Figure 1:
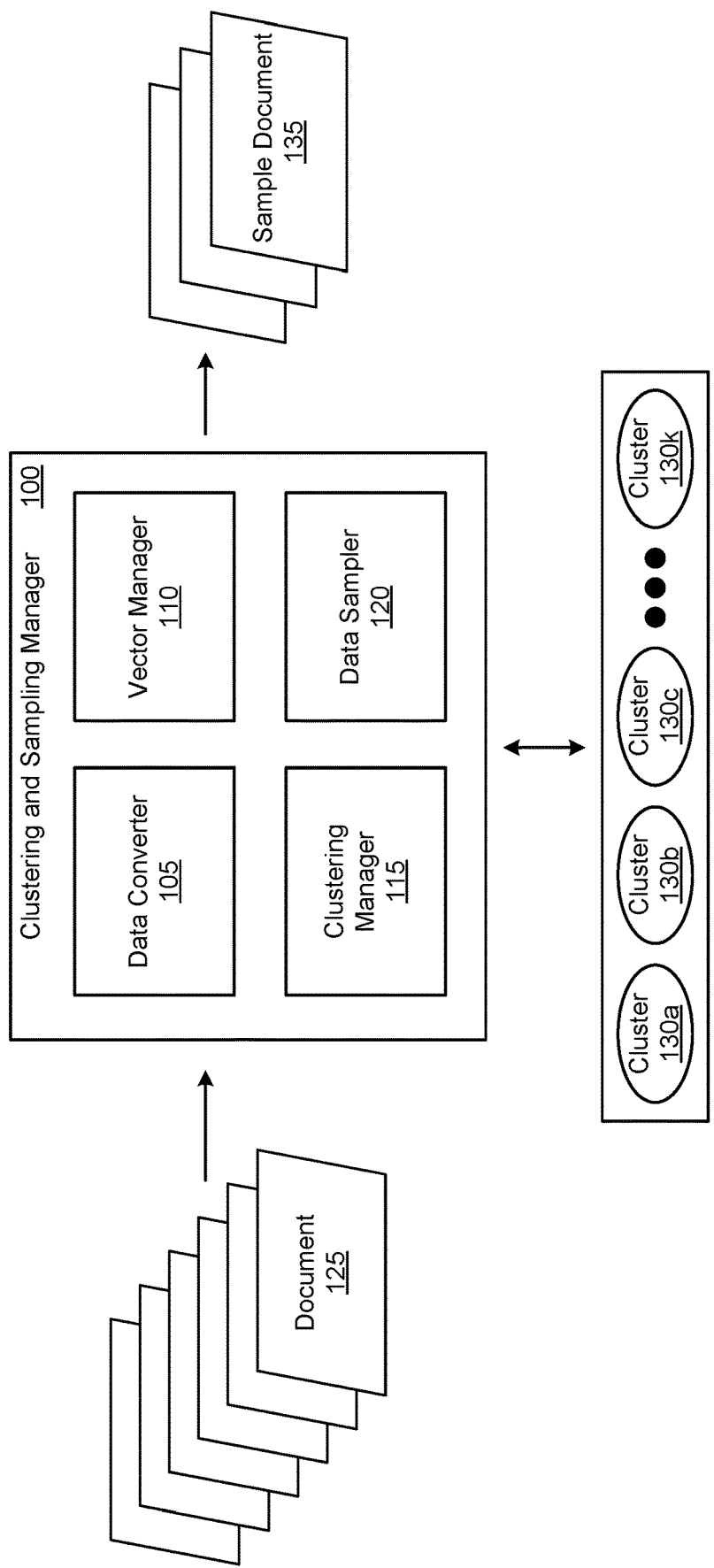
FIG. 1 illustrates a clustering and sampling manager according to some embodiments.

FIG. 1 illustrates a clustering and sampling manager 100 according to some embodiments. As shown, clustering and sampling manager 100 includes data converter 105, vector manager 110, clustering manager 115, and data sampler 120. Data converter 105 handles incoming documents. For instance, FIG. 1 shows clustering and sampling manager 100 receiving, as input, several documents 125. In some embodiments, each of the documents 125 are text documents. For example, documents 125 may be portable document format (PDF) files. In this example, when clustering and sampling manager 100 receives documents 125, clustering and sampling manager 100 sends them to data converter 105. Upon receiving documents 125, data converter 105 converts each document 125 into a set of images. In some cases, a document 125 can have several pages. For each page in a document 125, data converter 105 converts the page into an image. For instance, if a document 125 has five pages, data converter 105 converts the document 125 into five images, one image for each page. After converting documents 125 into sets of images, data converter 105 sends the images to vector manager 110 for further processing.

Vector manager 110 is configured to generate vector representations for documents 125 based on images of the document 125 that vector manager 110 receives from data converter 105. To generate a vector representation for a document 125, vector manager 110 may use a visual model configured to detect and classify objects in images. In some embodiments, the visual model can be implemented using a convolutional neural network (CNN). Examples of CNN architectures used to implement the visual model include a visual geometry group (VGG)-16 architecture, a VGG-19 architecture, a residual neural network (ResNet) architecture, a dense convolutional network (DenseNet) architecture, etc.

Figure 2:
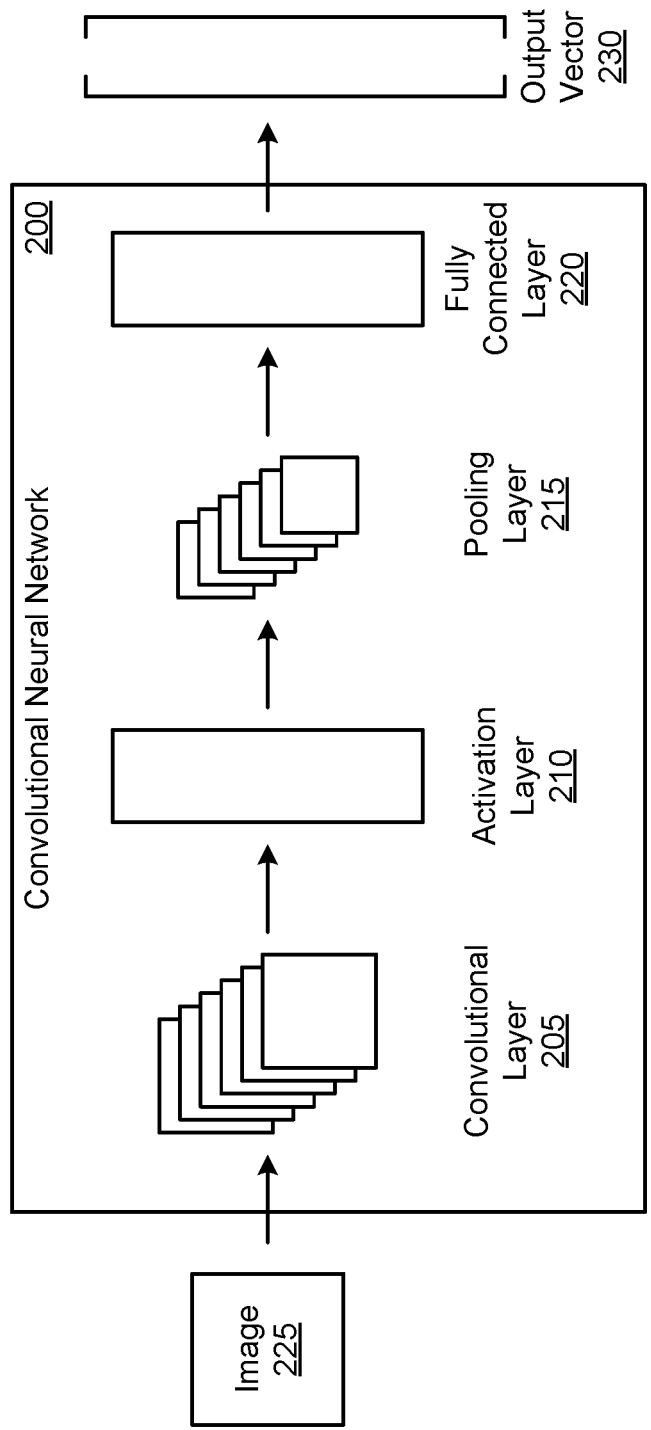
FIG. 2 illustrates an example convolutional neural network according to some embodiments.

FIG. 2 illustrates an example convolutional neural network 200 according to some embodiments. Specifically, FIG. 2 illustrates an example CNN that may be used to implement the visual model used by vector manager 110 to generate vector representations of documents 125. As shown, CNN 200 includes convolutional layer 205, activation layer 210, pooling layer 215, and fully connected layer 220. Convolutional layer 205 may be a filter that is passed over image 225 and views several pixels at a time (e.g. 3×3 or 5×5). A convolution operation is performed by calculating a dot product of the original pixel values with weights defined in the filter. The results are summed up into one number that represents all the pixels observed by the filter. Convolutional layer 205 can generates a matrix that is smaller in size than the pixel resolution of image 225. Activation layer 210 analyzes the matrix generated by convolutional layer 205 by introducing non-linearity so that CNN 200 can train itself using a backpropagation algorithm. In some embodiments, the activation function used in the backpropagation algorithm may be a rectified linear unit (ReLu) function. Pooling layer 215 may downsample and reduce the size of the matrix. A filter is passed over the results of the previous layer and selects one number out of each group of values (e.g., the maximum value). Pooling layer 215 allows CNN 200 to train faster by focusing on the most important information in each feature of the image. Fully connected layer 220 can be a multilayer perceptron structure. The input to fully connected layer 220 is a one-dimensional vector representing the output of the previous layers (e.g., convolutional layer 205, activation layer 210, and pooling layer 215). The output of fully connected layer 220 is output vector 230, a one-dimensional vector. Output vector 230 is the vector representation of image 225.

FIG. 2 illustrates a CNN with one group of layers that includes a convolutional layer, an activation layer, and a pooling layer. One of ordinary skill in the art will realize that, in some embodiments, any number of additional groups of such layers may be included and sequentially arranged in CNN 200. For example, CNN 200 may include a first group of layers that includes a first convolutional layer, a first activation layer, and a first pooling layer, followed by a second group of layers that includes a second convolutional layer, a second activation layer, and a second, pooling layer, and so on and so forth. Additionally, CNN 200 can include any number of additional fully connected layers after the groups of layers that includes convolutional, activation layer, and pooling layers. The output of the last fully connected layer is output vector 230.

Returning to FIG. 1, vector manager 110 can generate a vector representation for a document 125 by generating a vector (e.g., output vector 230) for each image in the set of images into which data converter 105 converted the document 125. In some embodiments, a vector of a page of a document is a numerical representation of the visual appearance of the page in terms of formatting, layout, styles, etc. After generating vectors for the pages of each document 125, vector manager 110 sends the vectors to clustering manager 115 for additional processing.

Clustering manager 115 is responsible for grouping (e.g., clustering) documents 125 into different groups (e.g., clusters) based on the vector representations of documents 125. As illustrated in FIG. 1, clustering manager 115 has grouped documents 125 into clusters 130a-130k. In some embodiments, clustering manager 115 groups documents into clusters 130a-130k by grouping each page of documents 125 into clusters 130a-130k based on the vectors of each page of the documents 125. Clustering manager 115 groups documents (or pages of documents) with similar vectors into the same cluster 130. In some embodiments, clustering manager 115 determines that two vectors are similar if the vector distance between the two vectors is less than a defined distance value. In some such embodiments, clustering manager 115 determines the vector distance between the two vectors by calculating the cosine similarity between the two vectors. Cosine similarity uses values between 0 and 1 to represent the similarity between two vectors, where 0 represents the least amount of similarity and 1 represents the most amount of similarity. As such, clustering manager 115 determines that two vectors are similar if the cosine similarity value is greater than a defined value (e.g., 0.8). Clustering manager 115 can use any number of different clustering algorithms to group documents 125 into clusters 130a-130k based on the vector representations of documents 125. For example, in some embodiments, clustering manager 115 uses a hierarchical clustering algorithm to group documents 125 into clusters 130a-130k. In other embodiments, clustering manager 115 uses a K-means algorithm to group documents 125 into clusters 130a-130k. In yet some other embodiments, clustering manager 115 uses a density-based spatial clustering of applications with noise (DB SCAN) algorithm to group documents 125 into clusters 130a-130k. As mentioned above, a vector of a page of a document is a numerical representation of the visual appearance of the page in terms of formatting, layout, styles. Thus, the documents 125 that clustering manager 115 groups in a particular cluster 130 are essentially all visually similar in terms of formatting, layout, styles, etc. Once clustering manager 115 finishes grouping documents 125 into clusters 130a-130k, clustering manager 115 sends the groupings to data sampler 120.

Data sampler 120 is configured to sample data from the clusters determined by clustering manager 115. For example, when data sampler 120 receives clusters 130a-130k from clustering manager 115, data sampler 120 determines a sample set of documents 135 from documents 125 based on the set of clusters 130a-130k. Data sampler 120 can randomly select a defined number of documents (or pages of documents) from each of the clusters 130a-130k. The selected documents from each of the clusters 130a-130k form the sample set of documents 135. In some embodiments, data sampler 120 randomly selects a first defined number of documents (e.g., five documents, ten documents, etc.) from a particular cluster 130 if the number of documents (or pages of documents) in the particular cluster 130 is greater than a defined threshold number of documents (e.g., twenty documents, fifty documents, etc.). If the number of documents in the particular cluster 130 is not greater than the defined threshold number of documents, data sampler 120 randomly selects a second defined number of documents (e.g., two documents, three documents, etc.) from the particular cluster 130.

Figure 3:
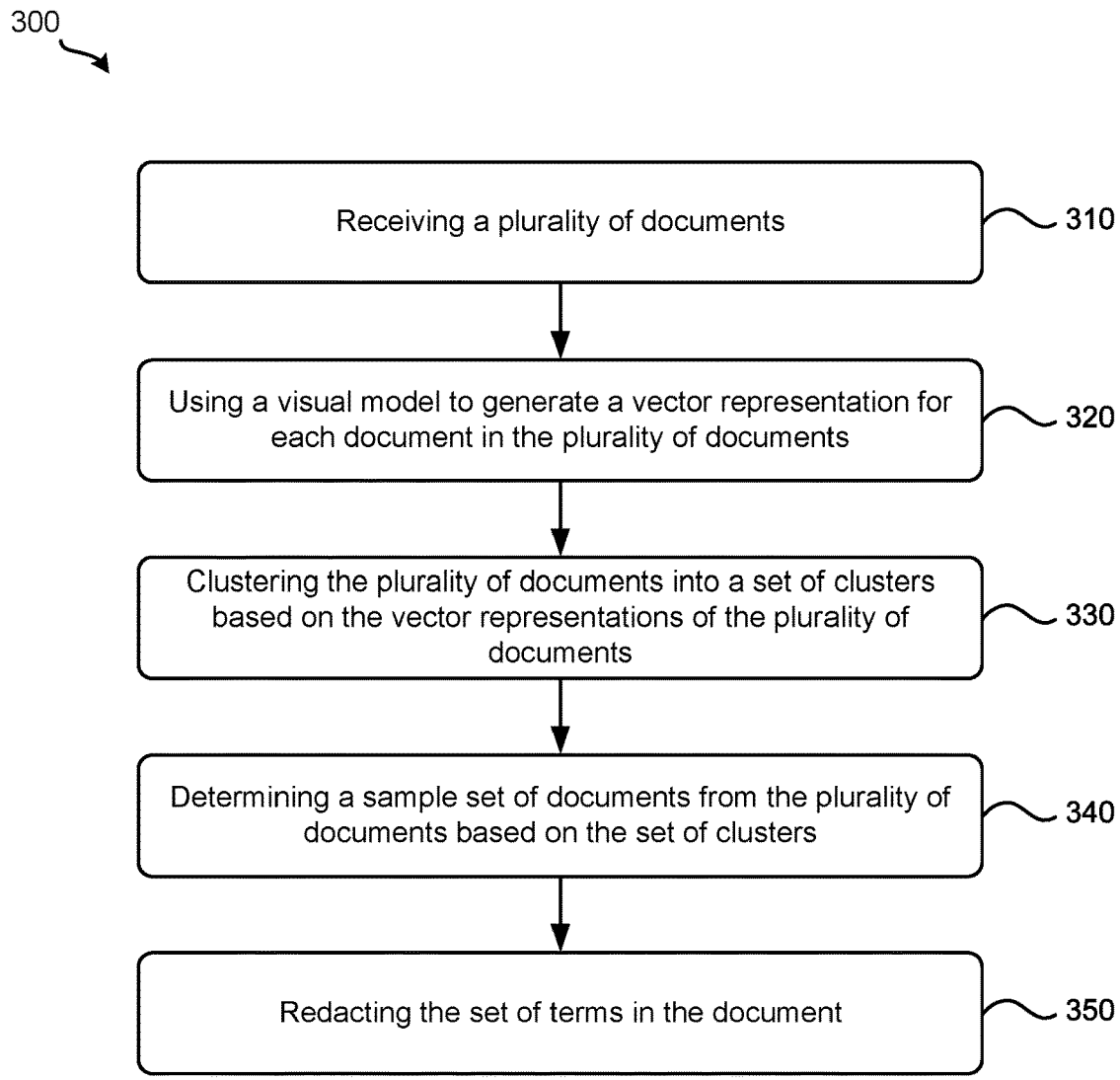
FIG. 3 illustrates a process for clustering and sampling data according to some embodiments.

FIG. 3 illustrates a process 300 for clustering and sampling data according to some embodiments. In some embodiments, clustering and sampling manager 100 performs process 300. Process 300 begins by receiving, at 310, a plurality of documents. Referring to FIG. 1 as an example, clustering and sampling manager 100 can receive a plurality of documents 125. Once received, cluster and sampling manager 100 may send documents 125 to data converter 105 to convert to images.

Next, process 300 uses, at 320, a visual model to generate a vector representation for each document in the plurality of documents. Referring to FIGS. 1 and 2 as an example, vector manager 110 may use a visual model to generate vector representations for documents 125. The visual model used by vector manager 110 can be implemented using CNN 200. As illustrated in FIG. 2, the values of pixels in image 225 are input into CNN 200 and propagated through the input layer and hidden layers 1-$n$. The values output by neurons 224-230 of the last hidden layer, hidden layer n, form an output vector 230 that is the vector representation of image 225. As such, vector manager 110 can generate vector representations for documents 125 using the images into which data converter 105 converted documents 125.

Process 300 then clusters, at 330, the plurality of documents into a set of clusters based on the vector representations of the plurality of documents. Referring to FIG. 1 as an example, clustering manager 115 can cluster documents 125 into clusters 130a-130k based on the vector representations of documents 125. Clustering manager 115 may group documents (or pages of documents) with similar vectors into the same cluster 130.

Finally, process 300 determines, at 340, a sample set of documents from the plurality of documents based on the set of clusters. Referring to FIG. 1 as an example, data sampler 120 can determine a sample set of documents 135 from the plurality of documents 125 based on clusters 130a-130k. Data sampler 120 may randomly select a defined number of documents (or pages of documents) from each of the clusters 130a-130k. The selected documents collectively form the sample set of documents 135. In some embodiments, data sampler 120 can randomly select a different defined number of documents from a particular cluster 130 based on the number of documents (or pages of documents) in the particular cluster 130. For example, if the number of documents in the particular cluster 130 is greater than a defined threshold number of documents, data sampler randomly selects a first defined number of documents from the particular cluster 130. Otherwise, data sampler 120 randomly selects a second defined number of documents, which is different than the first defined number of documents, from the particular cluster 130.

2. Example Active Learning System

The section above describes a clustering and sampling manager that clusters data (e.g., documents) based on a visual model and randomly samples the data based on the clustered data. The clustering and sampling manager can be used in any number of different scenarios. For example, in some embodiments, the clustering and sampling manager may be used in an active learning system that automates many of the active learning operations for in artificial intelligence (AI) and machine learning algorithms.

Figure 4:
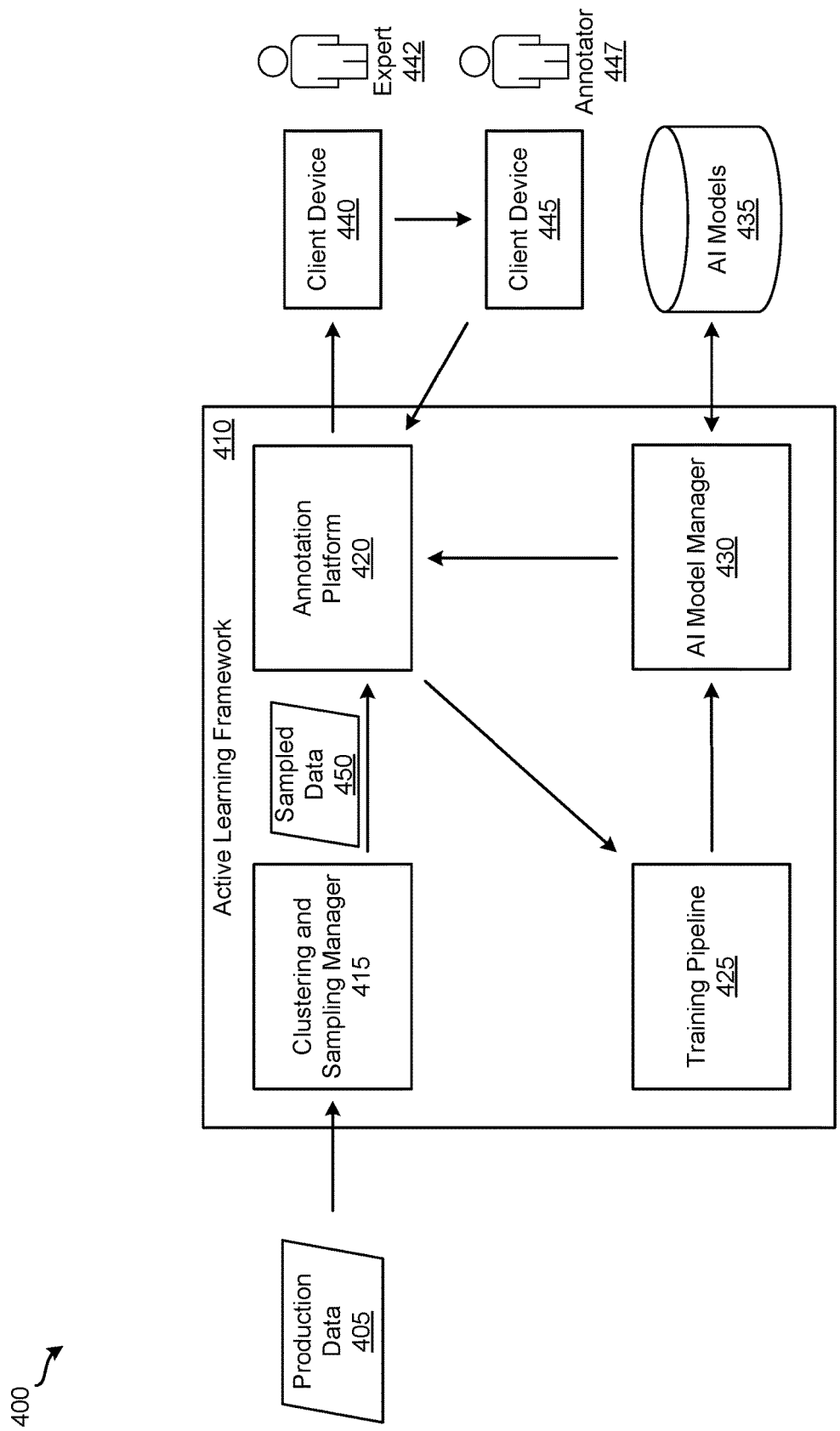
FIG. 4 illustrates a system for facilitating active learning according to some embodiments.

FIG. 4 illustrates a system 400 for facilitating active learning according to some embodiments. In particular, FIG. 4 illustrates an example of a scenario in which a clustering and sampling manager may be used. As shown, system 400 includes production data 405, active learning framework 410, AI models storage 435, client device 440, and client device 445. Active learning framework 410 may receive production data 405. In some embodiments, production data 405 includes text documents (e.g., documents 125, etc.) that is received from users of a document processing system (e.g., a medical document processing system) and stored in a data storage (e.g., a database). AI models storage 435 stores trained AI models that are configured to automatedly annotate documents (e.g., production data 405) without human intervention. Client devices 440 and 445 are configured to interact and communicate with active learning framework 410. For example, users of client devices 440 and 445 can access annotation platform 420 to annotate documents and review annotated documents.

As illustrated in FIG. 4, active learning framework 410 includes clustering and sampling manager 415, annotation platform 420, training pipeline 425, and AI model manager 430. Clustering and sampling manager 415 can be implemented by clustering and sampling manager 100. As such, clustering and sampling manager 415 receives, as input, production data 405. As mentioned above, in some embodiments, production data 405 includes text documents that is received from users of a document processing system and stored in a data storage. In some such embodiments, clustering and sampling manager 415 retrieves production data 405 from the data storage at defined intervals (e.g., once a week, once every two weeks, once a month, etc.). Then, clustering and sampling manager 415 uses a visual model to generate vector representations of production data 405, cluster production data 405 into groups based on the vector representations, and determine a sample of production data 405 (sampled data 450 in this example) based on the groups of production data 405. Clustering and sampling manager 415 can also store the vector representations of production data 405 in a data storage (e.g., a database). The, the next time clustering and sampling manager 415 receives production data that has not been annotated, clustering and sampling manager 415 can compare the similarity of the vector representations of the newly received production data with the vector representations of previously processed production data. Clustering and sampling manager 415 does not consider any production data in the newly received production data that is similar to previously processed production data when determining sampled data 450. As such, when clustering and sampling manager 415 samples the newly received production data to generate sampled data 450, clustering and sampling manager 415 samples from the remaining production data that does not include data that is similar to previously processed production data. Clustering and sampling manager 415 sends sampled data 450 to annotation platform 420.

Annotation platform 420 provides tools and services for a user (annotator 447 in this example) of client device 445 to annotate sampled data 450. For instance, annotation platform 420 can organize sampled data 450 and provide client device 445 a graphical user interface (GUI) for presenting sampled data 450 to annotator 447. In this way, annotator 447 is able to provide annotation platform 420, via the GUI presented on client device 445, annotations and/or labels to sampled data 450. In some embodiments, the sampled data 450 that annotator 447 annotates has already been automatedly annotated by AI model manager 430. In some such embodiments, annotator 447 reviews the automatedly annotated sampled data 450 and ensures that the annotations are correct. After annotator 447 is done annotating sampled data 450, annotation platform may organize the annotated sampled data 450 and provide client device 440 a GUI for presenting the annotated sampled data 450 to expert 442. Expert 442 can review the annotated sampled data 450 to ensure that the annotations and/or labels are correct. Having an expert review sampled data 450 annotated by annotator 447 is particularly useful in certain domains (e.g., medial domain, legal domain, engineering domain, etc.) that require specialized knowledge. Once expert 442 has finished reviewing the annotated sampled data 450, client device 440 can send the reviewed sampled data 450 to client device 445 for annotator 447 to view. This way, annotator 447 can see the corrections made to the annotated sampled data 450 and prevent such mistakes from happening for future annotations of data. In addition, after expert 442 has finished reviewing the annotated sampled data 450, annotation platform 420 sends the reviewed and annotated sampled data 450 to training pipeline 425 for further processing.

Training pipeline 425 is configured to train AI models. For instance, to train a new AI model, training pipeline 425 may generate the AI model and then train the AI model using the reviewed and annotated sampled data 450 that training pipeline 425 receives from annotation platform 420. Once training pipeline 425 completes the training of the AI model based on the reviewed and annotated sampled data 450, training pipeline 425 stores it in AI models storage 435. When training pipeline 425 receives more sampled data from annotation platform 420, training pipeline 425 retrieve the AI model from AI models storage 435, trains it using the received sampled data, and stores the AI model back in AI models storage 435 after training pipeline 425 finishes training the AI model with the sampled data. In some embodiments, the AI model that is trained by training pipeline 425 and used by AI model manager 430 is the visual model of the sectionizer described in concurrently filed U.S. patent application Ser. No. _____, titled "Sectionizing Documents Based On Visual And Language Models," filed on Dec. 3, 2019, which is herein incorporated by reference in its entirety. In other embodiments, the AI model that is trained by training pipeline 425 and used by AI model manager 430 an image classification model, an instance segmentation model, etc.

AI model manager 430 is responsible for automatedly annotation data. For example, AI model manager 430 can receive from annotation platform 420 data and a request to annotate the data. In response to the request, AI model manager 430 retrieves the appropriate AI model from AI models storage 435. In the case of data that is similar to production data 405, AI model manager 430 retrieves the AI model from AI models storage 435 that has been trained using sampled data 450 and is configured to annotate data. Next, AI models manager 430 uses the retrieved AI model to automatedly annotate sampled data 450 received from annotation platform 420. After automatedly annotating sampled data 450, AI model manager 430 sends the annotated data to annotation platform 420.

3. Example Systems

Figure 5:
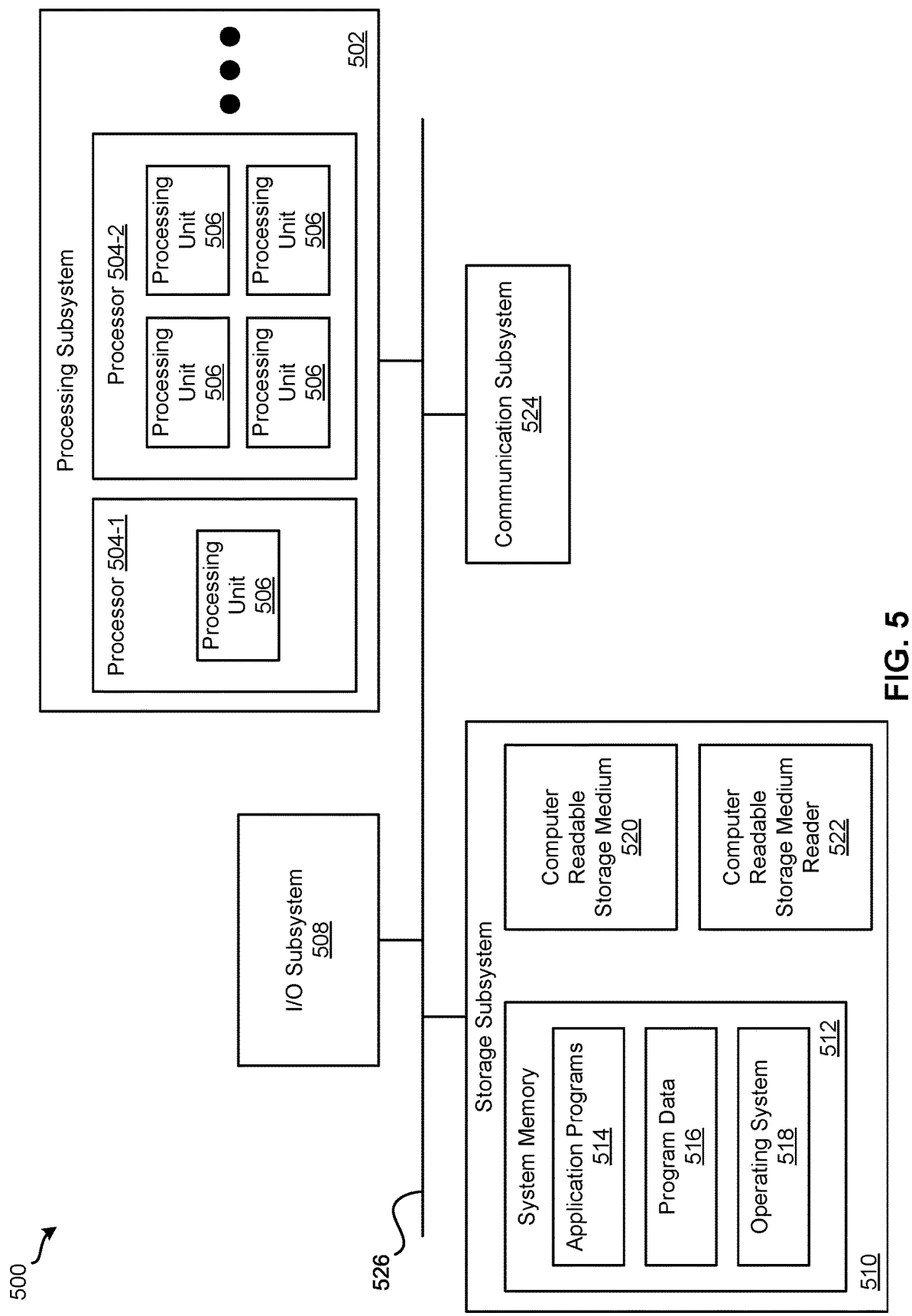
FIG. 5 illustrates an exemplary computer system, in which various embodiments may be implemented.

FIG. 5 illustrates an exemplary computer system 500 for implementing various embodiments described above. For example, computer system 500 may be used to implement clustering and sampling manager 100, active learning framework 410, clustering and sampling manager 415, annotation platform 420, training pipeline 425, AI model manager 430, client device 440, and client device 445. Computer system 500 may be a desktop computer, a laptop, a server computer, or any other type of computer system or combination thereof. Some or all elements of data converter 105, vector manager 110, clustering manager 115, data sampler 120, clustering and sampling manager 415, annotation platform 420, training pipeline 425, AI model manager 430, or combinations thereof can be included or implemented in computer system 500. In addition, computer system 500 can implement many of the operations, methods, and/or processes described above (e.g., process 300). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 300, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514, program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., data converter 105, vector manager 110, clustering manager 115, data sampler 120, clustering and sampling manager 415, annotation platform 420, training pipeline 425, and AI model manager 430) and/or processes (e.g., process 300) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
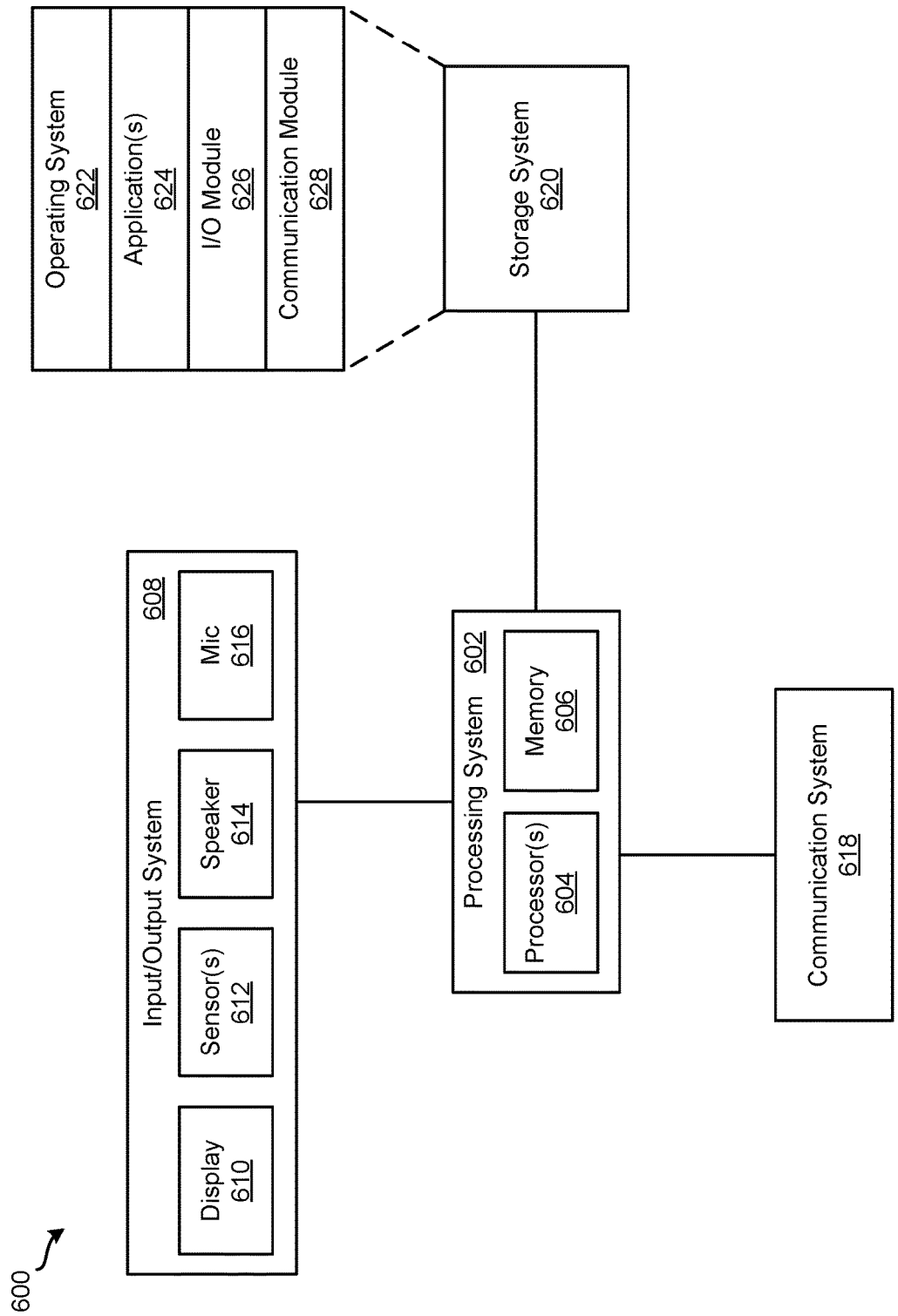
FIG. 6 illustrates an exemplary computing device, in which various embodiments may be implemented.

FIG. 6 illustrates an exemplary computing device 600 for implementing various embodiments described above. For example, computing device 600 may be used to implement client device 440 and client device 445. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
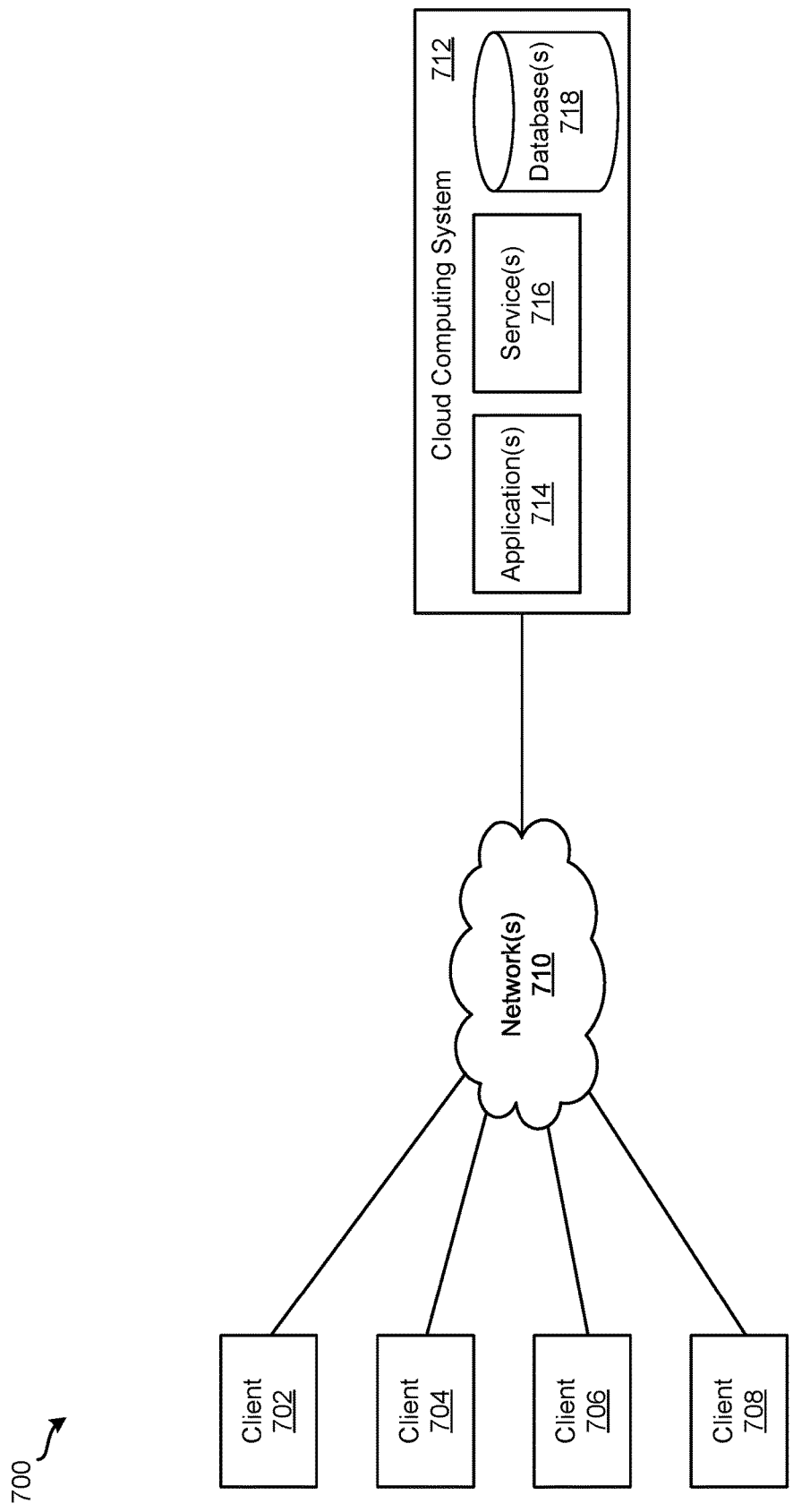
FIG. 7 illustrates an exemplary system, in which various embodiments may be implemented.

FIG. 7 illustrates an exemplary system 700 for implementing various embodiments described above. For example, one of client devices 702-708 may be used to implement client device 440, one of client devices 702-708 may be used to implement client device 445, and cloud computing system 712 may be used to implement active learning platform 410. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, AI models storage 435 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving a plurality of documents;
   generating a vector representation using a visual model for each document in the plurality of documents, wherein the visual model detects pixel values for each page of each document and propagates the pixel values through a neural network to generate the vector representation;
   clustering each page of each document into a set of clusters based on the vector representations of the plurality of documents;
   determining a sample set of documents from the plurality of documents based on the set of clusters, wherein the sample set of documents includes at least a first set of documents from a first set of clusters and a second set of documents from a second set of clusters;
   receiving annotations for each document in the sample set of documents from an annotator; and
   training an annotation AI model using the received annotations for each document in the sample set of documents.

2. The non-transitory machine-readable medium of claim 1, wherein the program further comprises a set of instructions for converting each page of each document in the plurality of documents into an image, wherein generating the vector representation for the document comprises generating, by the visual model, a vector for each image based on the pixel values.

3. The non-transitory machine-readable medium of claim 2, wherein clustering each page of each document into the set of clusters comprises clustering each image into the set of clusters based on the vector representations.

4. The non-transitory machine-readable medium of claim 1, wherein the clustering comprises grouping pages in the plurality of documents having similar vector representations into a same cluster.

5. The non-transitory machine-readable medium of claim 4, wherein a first document in the plurality of documents and a second document in the plurality of documents have similar vector representations if a cosine similarity between the vector representation of the first document and the vector representation of the second document is greater than a defined threshold value.

6. The non-transitory machine-readable medium of claim 1, wherein determining the sample set of documents from the plurality of documents comprises randomly selecting a set of documents from each cluster in the set of clusters and including the set of documents in the sample set of documents.

7. The non-transitory machine-readable medium of claim 1, wherein the visual model is implemented using a convolutional neural network comprising an input layer and a set of hidden layers.

8. A method comprising:
   receiving a plurality of documents;
   generating a vector representation using a visual model for each document in the plurality of documents, wherein the visual model detects pixel values for each page of each document and propagates the pixel values through a neural network to generate the vector representation;
   clustering each page of each document into a set of clusters based on the vector representations of the plurality of documents;
   determining a sample set of documents from the plurality of documents based on the set of clusters, wherein the sample set of documents includes at least a first set of documents from a first set of clusters and a second set of documents from a second set of clusters;
   receiving annotations for each document in the sample set of documents from an annotator; and
   training an annotation AI model using the received annotations for each document in the sample set of documents.

9. The method of claim 8, further comprising converting each page of each document in the plurality of documents into an image, wherein generating the vector representation for the document comprises generating, by the visual model, a vector for each image based on the pixel values.

10. The method of claim 9, wherein clustering each page of each document into the set of clusters comprises clustering each image into the set of clusters based on the vector representations.

11. The method of claim 8, wherein the clustering comprises grouping pages in the plurality of documents having similar vector representations into a same cluster.

12. The method of claim 11, wherein a first document in the plurality of documents and a second document in the plurality of documents have similar vector representations if a cosine similarity between the vector representation of the first document and the vector representation of the second document is greater than a defined threshold value.

13. The method of claim 8, wherein determining the sample set of documents from the plurality of documents comprises randomly selecting a set of documents from each cluster in the set of clusters and including the set of documents in the sample set of documents.

14. The method of claim 8, wherein the visual model is implemented using a convolutional neural network comprising an input layer and a set of hidden layers.

15. A system comprising:
a set of processing units; and
a non-transitory machine-readable medium storing instructions that when executed by at least one processing unit in the set of processing units cause the at least one processing unit to:
receive a plurality of documents;
generate a vector representation using a visual model for each document in the plurality of documents, wherein the visual model detects pixel values for each page of each document and propagates the pixel values through a neural network to generate the vector representation;
cluster each page of each document into a set of clusters based on the vector representations of the plurality of documents;
determine a sample set of documents from the plurality of documents based on the set of clusters, wherein the sample set of documents includes at least a first set of documents from a first set of clusters and a second set of documents from a second set of clusters;
receiving annotations for each document in the sample set of documents from an annotator; and
training an annotation AI model using the received annotations for each document in the sample set of documents.

16. The system of claim 15, wherein the instructions further cause the at least one processing unit to convert each page of each document in the plurality of documents into an image, wherein generating the vector representation for the document comprises generating, by the visual model, a vector for each image based on the pixel values.

17. The system of claim 16, wherein clustering each page of each document into the set of clusters comprises clustering each image into the set of clusters based on the vector representations.

18. The system of claim 15, wherein the clustering comprises grouping pages in the plurality of documents having similar vector representations into a same cluster.

19. The system of claim 18, wherein a first document in the plurality of documents and a second document in the plurality of documents have similar vector representations if a cosine similarity between the vector representation of the first document and the vector representation of the second document is greater than a defined threshold value.

20. The system of claim 15, wherein determining the sample set of documents from the plurality of documents comprises randomly selecting a set of documents from each cluster in the set of clusters and including the set of documents in the sample set of documents.

* * * * *